(12) United States Patent
Mann

(10) Patent No.: US 6,275,782 B1
(45) Date of Patent: Aug. 14, 2001

(54) NON-INTRUSIVE PERFORMANCE MONITORING

(75) Inventor: Daniel Mann, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/072,830

(22) Filed: May 5, 1998

(51) Int. Cl.[7] .................................................. G01R 11/16
(52) U.S. Cl. .......................... 702/182; 702/183; 702/189; 702/198
(58) Field of Search ....................... 324/73 R; 340/173 R, 340/825.5; 702/186, 185, 183, 189, 198; 714/47; 380/46; 711/133, 137; 703/199; 365/233

(56) References Cited

U.S. PATENT DOCUMENTS

| | | | |
|---|---|---|---|
| 3,812,478 | * | 5/1974 | Tomisawa et al. ............... 340/173 R |
| 3,887,869 | * | 6/1975 | Connolly et al. ................... 324/73 R |
| 4,115,867 | | 9/1978 | Vladimirov et al. ................. 364/900 |
| 4,176,402 | | 11/1979 | Sipple .................................. 364/900 |
| 4,219,877 | | 8/1980 | Valdimirov et al. .................. 364/554 |
| 4,409,592 | * | 10/1983 | Hunt ................................... 340/825.5 |
| 4,608,559 | * | 8/1986 | Friedman et al. ................. 340/825.5 |
| 4,694,412 | * | 9/1987 | Domenik .............................. 364/717 |
| 5,392,289 | * | 2/1995 | Varian ................................... 371/5.4 |
| 5,412,587 | | 5/1995 | Holt et al. ............................ 364/717 |
| 5,557,548 | | 9/1996 | Gover et al. ...................... 364/551.01 |
| 5,657,253 | | 8/1997 | Dreyer et al. .................... 364/551.01 |
| 5,696,828 | * | 12/1997 | Koopman, Jr. ......................... 380/46 |
| 5,768,152 | | 6/1998 | Battaline et al. ................. 364/551.01 |
| 5,768,500 | * | 6/1998 | Agrawal et al. ................. 395/184.01 |
| 5,778,194 | | 7/1998 | McCombs ............................ 395/280 |
| 5,835,702 | | 11/1998 | Levine et al. .................... 395/183.15 |
| 5,835,705 | | 11/1998 | Larsen et al. .................... 395/184.01 |
| 5,919,268 | * | 7/1999 | McDonald ............................. 714/47 |
| 6,038,195 | * | 3/2000 | Farmwald et al. ................... 365/233 |
| 6,119,075 | * | 9/2000 | Dean et al. ........................... 702/186 |

FOREIGN PATENT DOCUMENTS 2304215   3/1997 (GB).

OTHER PUBLICATIONS

Richter, Jeffrey for Microsoft Corporation, "Custom Performance Monitoring for Your Windows NT Applications", copyright 1998, pp. 1–25, http://premium.microsoft.com/msdn/library/periodic/period98/html/layouts_performa_performa_oigi.htm.

(List continued on next page.)

*Primary Examiner*—Marc S. Hoff
*Assistant Examiner*—Carol S. Tsai
(74) *Attorney, Agent, or Firm*—Zagorin, O'Brien & Graham, LLP

(57) ABSTRACT

An integrated circuit includes a performance monitoring circuit which includes an adaptive adder circuit coupled to receive a first input signal indicative of a performance parameter of the integrated circuit and to provide a count value as a measure of the probability of the performance parameter. The adaptive adder circuit includes a random number generator circuit providing a random number, a counter circuit providing a count value and a comparator circuit coupled to compare the random number and the count value and to output a compare signal indicative thereof, the compare signal being provided to the counter as an up/down count signal. The adaptive adder circuit also includes a first logic circuit coupled to receive the performance parameter being measured and the compare signal which outputs a first signal which is used for controlling operation of the counter circuit. The counter circuit is responsive to count up or down when the first input signal and the compare signal are at different values and the counter circuit does not count when the first input signal and the compare signal are at the same value.

33 Claims, 5 Drawing Sheets

OTHER PUBLICATIONS

IBM Technical Disclosure Bulletin "Hardware Performance Trace Enhancement to Include Performance Events", vol. 39, No. 10, Oct. 1996, pp. 87–88.

IBM Technical Disclosure Bulletin "Self–Adjusting Utilization Monitor", vol. 38, No. 2, Feb. 1995, pp. 371–372.

Rohava, S. Ye., "Elements of Stochastic Systems —instrumentation of Non–Deterministic Learning Patterns", Soviet Automatic Control, vol. 13, No. 5, 1968, pp. 67–69.

Miller, A.J. et al., "A study for an output interface for a digital stochastic computer", Int. J. Electronics, vol. 37, No. 5, 1974, pp. 637–655.

Gaines, Brian R., "Stochastic computer thrives on noise", Electronics, vol. 40, No. 14, Jul. 10, 1967, pp. 72–81.*

IBM Technical Disclosure Bulletin, vol. 40, No. 1, "Processor Performance Monitoring with a Depiction of the Efficency of the Cache Coherency Protocol of a Superscalar Microprocessor in an Symmetric Multiple Processor Environment", Jan. 1997, pp. 79.81.*

* cited by examiner

NON-INTRUSIVE PERFORMANCE MONITORING

BACKGROUND OF THE INVENTION

1. Field of the Invention

The invention relates to performance monitoring in integrated circuits.

2. Description of the Related Art

Most microprocessors used in desk top computer systems, are equipped with performance monitoring counters. These counters permit processor performance parameters to be monitored and measured. Such information is useful for performance tuning. Current techniques typically utilize two counters which simultaneously record the occurrence of prespecified events. W hen one of the counters overflows, counting stops and an interrupt is generated. Post-processing software is use d to analyze the gathered data.

Typically two large counters, of e.g., 40-bits or more, are provided for event counting. The counters can generally be read and written from within register address space. The counters can be configured to measure such parameters as the number of data reads that hit in the cache. When configured to determined cache hits, the first counter is programmed to record the number of cache hits and the second counter is programmed to record the number of actual data reads performed. The ratio of the two numbers gives the cache hit rate for read operations. Measured performance parameters are a good estimate of future performance. Actual performance at any instant may vary widely from the measured estimate. The typical use of two large counters does not make any attempt to measured this deviation from the average.

When one of the counters reaches its limit, the overflow signal stops all counting and generates an interrupt. The software interrupt handler then records the counter values, completes post data processing and any other support work necessary.

The size of the counters is important. The larger the counter, the less frequently an interrupt is generated. Such interrupts are undesirable because they intrude into normal processor operation. A larger counter also results in greater data averaging. Therefore, temporary fluctuation in cache hit rate may not be observed. Such temporary fluctuations may, or may not be what is of interest.

Before performance monitoring can be accomplished, an interrupt handler must be installed to deal with counter overflow. Of course, overflow can be avoided by the use of extremely large counters. But extremely large counters may be expensive to implement, unreliable or fail to produce the desired analysis. It would be desirable to monitor performance parameters in an integrated circuit such as a processor without having to provide two large counters, without having to deal with counter overflow, without having to provide software interrupt handlers. It would also be desirable to avoid intrusion of the performance monitoring into the normal functioning of the processor in the system.

SUMMARY OF THE INVENTION

Accordingly, the invention provides a new technique for gathering and analyzing performance data with a microprocessor or microcontroller or other integrated circuit. The technique avoids the limitations imposed by fixed size counters which eventually overflow. The method is less intrusive and suitable for monitoring a wide range of performance parameters.

In a first embodiment an integrated circuit includes a performance monitoring circuit which includes an adaptive adder circuit coupled to receive a first input signal indicative of a performance parameter of the integrated circuit and to provide a count value as a measure of the performance parameter. The adaptive adder circuit includes a random number generator circuit providing a random number, a counter circuit providing a count value and a comparator circuit coupled to compare the random number and the count value and to output a compare signal indicative thereof, the compare signal being provided to the counter as an up/down count signal. The adaptive adder circuit also includes a first logic circuit coupled to receive the performance parameter being measured and the compare signal. The first logic circuit outputs a first control signal which is used for controlling operation of the counter circuit. The counter circuit is responsive to count up or down when the first input signal and the compare signal are at different values and the counter circuit does not count when the first input signal and the compare signal are at the same value.

In another embodiment a method of measuring a performance parameter in an integrated circuit includes providing to an adaptive adder circuit, a first input signal indicative of the performance parameter and providing a count value in the adaptive adder circuit as a measure of the performance parameter. The method further includes generating a random number in a random number generator circuit, providing a counter circuit providing the count value, and comparing the random number and the count value and providing a compare signal. The compare signal is provided to the counter circuit as a first control signal. The method further includes logically combining the performance parameter and the compare signal to provide a second control signal for controlling operation of the counter circuit.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 1:
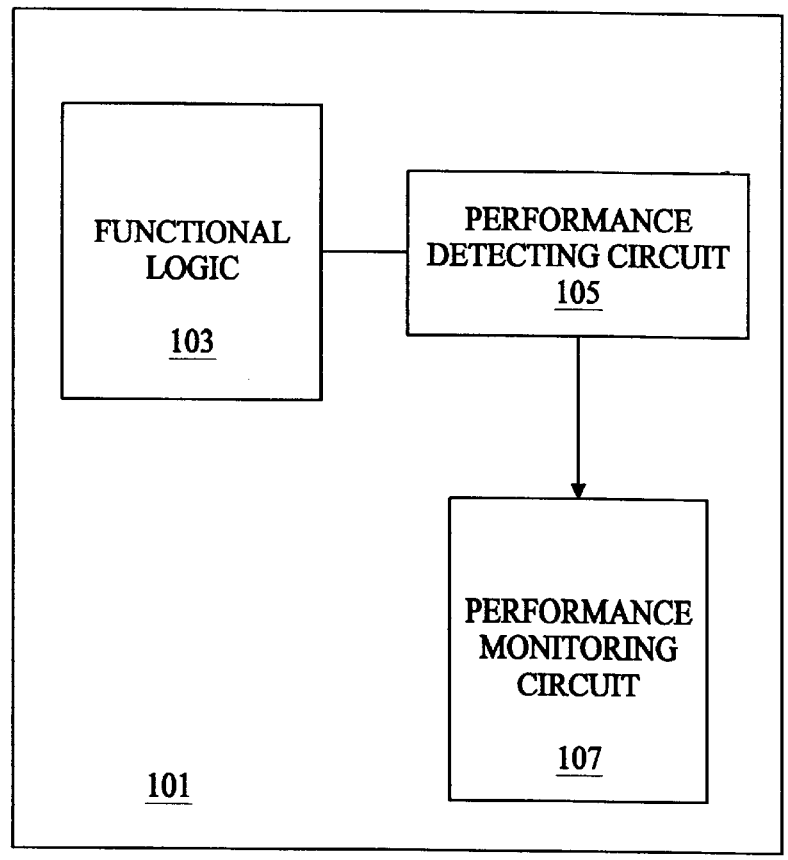
FIG. 1 shows a block diagram of an integrated circuit incorporating the present invention.

Referring to FIG. 1 an integrated circuit 101 which maybe a microprocessor or microcontroller having a processor on it, includes functional logic 103 such as an on-chip cache memory, a performance detecting circuit 105 that detects performance data, such as whether there was a cache hit and performance monitoring circuit 107. The type of performance data measured in integrated circuit 107 is random in nature; such as the cache hit rate, or the number of cycles to read memory. These parameters vary during program execution.

Consider for example, that at each memory access an on-chip cache may successfully provide the required data or may not. The sequence of hit and miss data can be determined by performance detecting circuit 105 and provided as a simple 1 or 0 bit stream to performance monitoring circuit 107. The probability of a 1 is the probability of a hit occurring. In order to measure the cache hit performance, a performance monitoring circuit such as one shown in FIG. 2 can be used to integrate the probability stream and determine the relevant probability of a cache hit or other performance parameter occurring.

Figure 2:
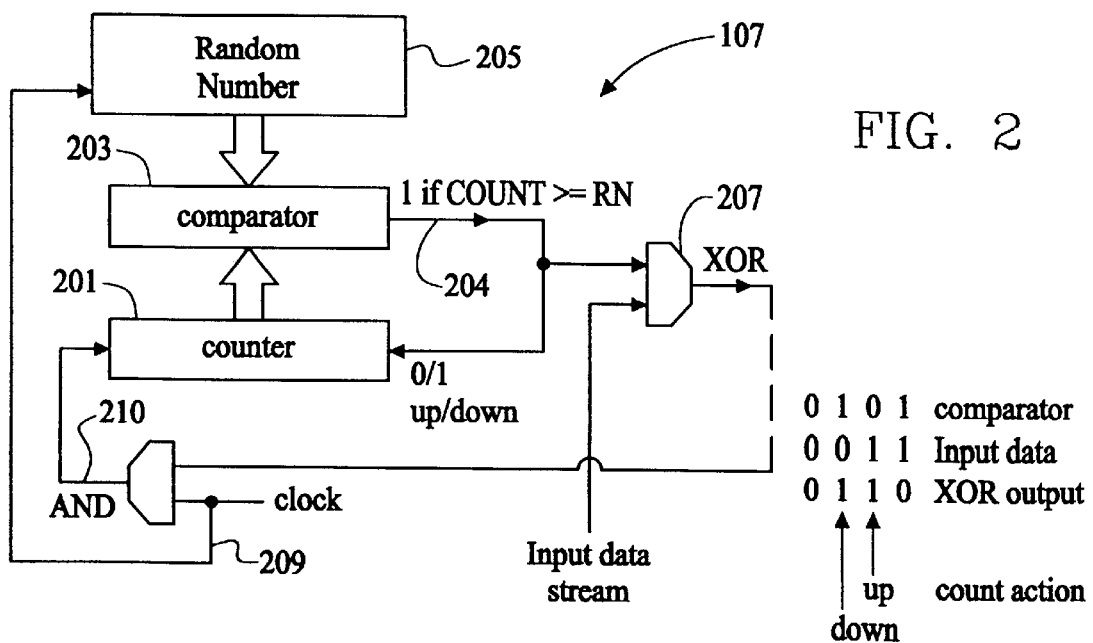
FIG. 2 shows an adaptive adder circuit according to one embodiment of the invention.

FIG. 2 shows one embodiment of an adaptive adder circuit used as performance monitoring circuit 107. A counter 201 provides a count value which is compared in comparator 203 with a random number generated in random number generator circuit 205. If the counter value is greater than or equal to the random number, a 1 is generated. Large counter values are more likely to produce a 1 output from the comparator than small counter values. The compare signal 204 output from the comparator is provided back to counter 201 as an up/down count signal. When the comparator indicates that the count is larger than the random number, the compare signal 204 configures the counter 201 as a down counter and when the count is less than the random number, the compare signal 204 configures counter to be an up counter.

The compare signal 204 is compared with the input data stream of interest. The input data stream is serially provided samples of the performance parameter being measured (e.g., the cache hit information) which are provided by performance detecting circuit 105. These two stochastic data streams (compare signal and input data stream) are compared to see which one has the highest probability of being 1. That is accomplished by XORing the two data streams together in XOR gate 207. When the data streams differ, there is a difference in probability. That probability information is fed back to increase or decrease the counter value according to the comparator output. The feedback in the illustrated embodiment is accomplished by ANDing together clock signal 209 and the output from XOR gate 207 to provide a gated clock signal 210 to the counter. Consequently, with each new comparison the counter is adjusted to produce a probability stream (from the comparator) which matches the input data stream.

Table 1 illustrates the action of the counter:

| comparator | 0 | 1 | 0 | 1 |
|---|---|---|---|---|
| performance parameter data | 0 | 0 | 1 | 1 |
| XOR output | 0 | 1 | 1 | 0 |
| count action | none | down | up | none |

The adaptive adder circuit effectively integrates the probability stream. The probability stream of the parameter being measured is converted into a digital value which is held in the counter. The counter value represents the probability of the parameter which is being measured.

This method of measuring probability has several advantages over the dual counter method. For example, there is no potential overflow and therefore no need for an overflow interrupt handler. In addition, the counter can be read at any time to give a measure of the current probability.

As the number of bits used by the counter and random number generator increase the probability resolution is improved. For example, an 8-bit counter provides for a probability resolution of 0.39% (1/255) However, increasing the resolution slows down the integration process. That results in a greater number of samples being required before a good estimate of probability can be obtained.

Figure 3:
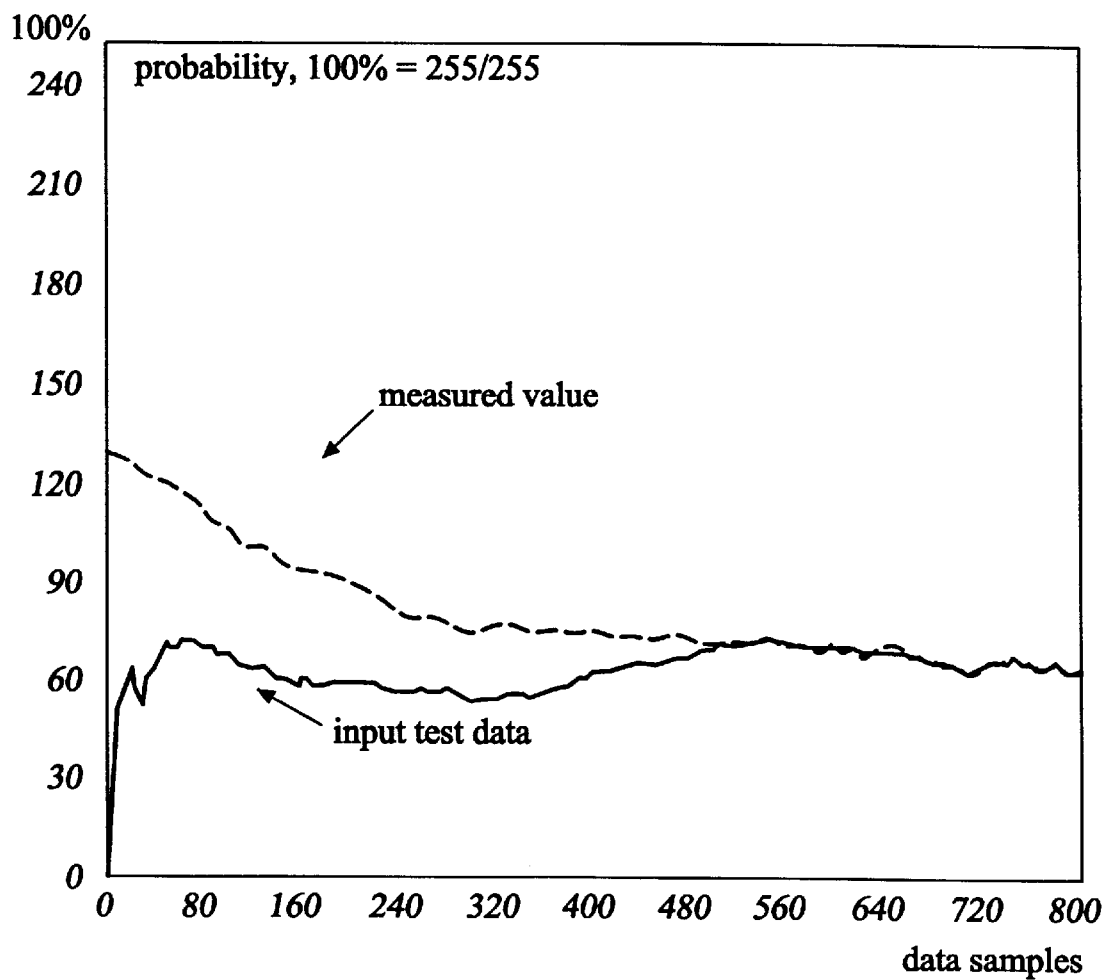
FIG. 3 shows a graph of measured and input test data for an adaptive adder circuit having an eight bit counter measuring an input data stream having a probability of 25%.

FIG. 3 shows a graph of measured and input test data from an 8-bit adaptive adder circuit used to measure an input data stream having a probability of 25%. The adaptive adder circuit generates with an initial value of 50%. As the input data is sampled, the adaptive adder circuit's counter value heads towards the expected value. After about 500 samples, the adaptive adder circuit closely tracks the input data stream. That indicates that after as little as 500 samples the counter could be read to produce a reasonable estimate of the performance parameter being measured.

Figure 4:
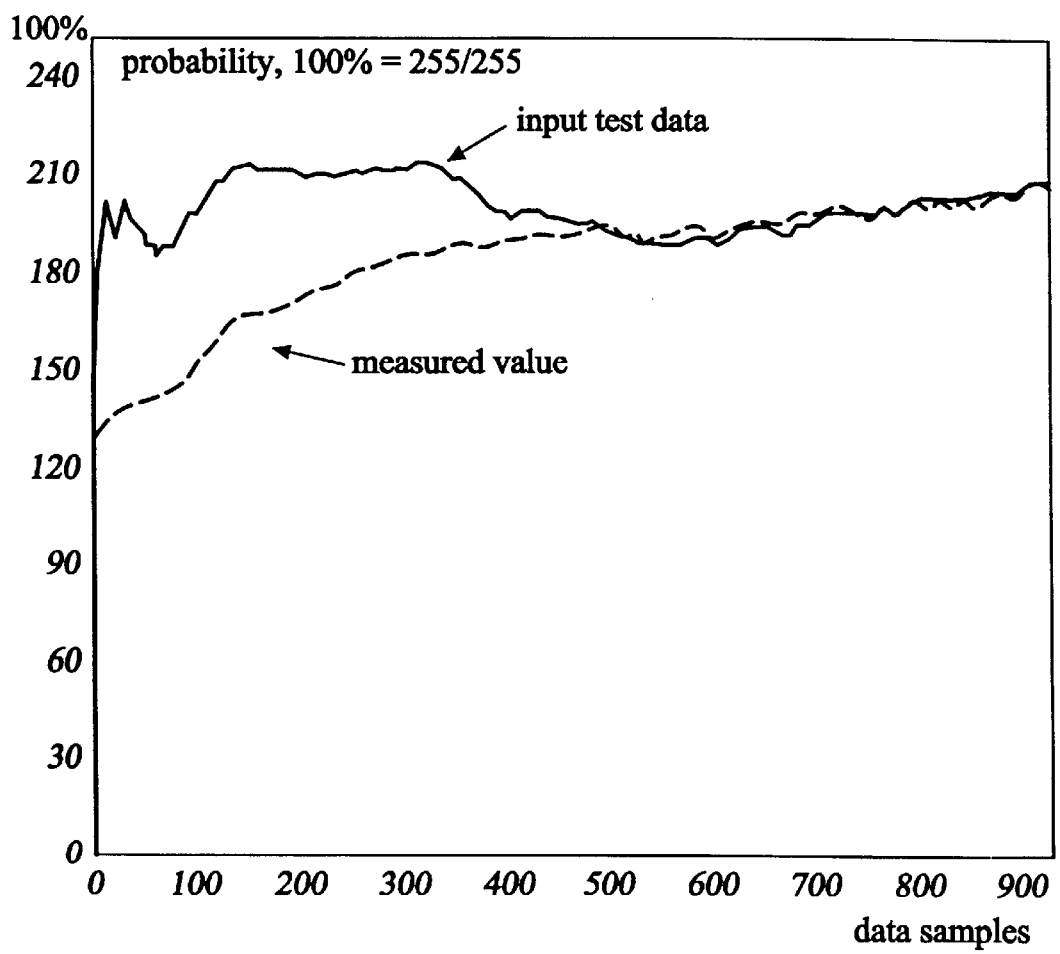
FIG. 4 shows a graph of measured and input test data for an adaptive adder circuit having an eight bit counter measuring an input data stream having a probability of 78%.
Figure 5:
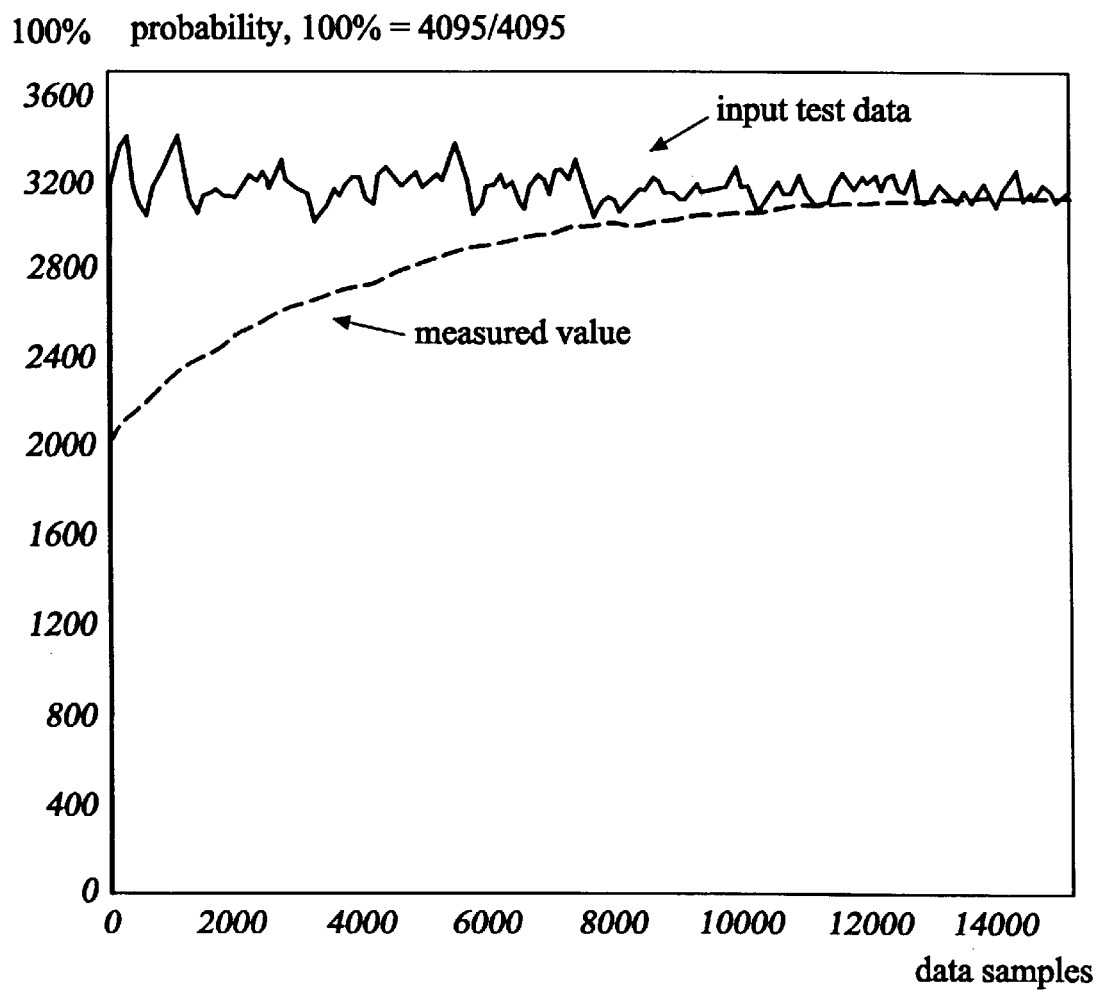
FIG. 5 shows a graph of measured and input test data for an adaptive adder circuit having a twelve bit counter measuring an input data stream having a probability of 78%.

During the generation of the presented data, the input data stream was averaged over a sliding window of 250 samples. Thus, each point shown graphed as input test data in FIGS. 3–5 represent the average of the last 250 samples (or less if the number of data samples is less than 250). Thus, the graphs show how quickly the measured value produces a reasonable estimate of a sliding window average of 250 samples. Keeping this window small helps observe temporary fluctuations in both the generated test data and adaptive adder circuit response.

FIG. 4 shows a graph of measured and input test data from 8-bit adaptive adder circuit used to measure an input data stream having a 78% probability. The 8-bit counter was initially at a value of 128, which represents a probability of 50% (128/256). Once again, after about 500 samples the counter produces a good estimate tracking the input data.

The time taken by the adaptive adder circuit's counter to move from its current position to a good estimate of the performance data depends on the number of bits used by the counter. An 8-bit counter takes only 256 clocks to increment through its full range. A 12-bit counter takes 4096 clock pulses to cover its complete range. The extra 4 bits of probability resolution requires 16 times more clocks to reach its complete counting range. This directly relates to the number of samples required to measure a performance parameter. Greater resolution requires a greater number of samples to achieve a measurement with similar confidence.

FIG. 5 shows a graph of measured and input test data from a 12-bit adaptive adder circuit used to measure an input data stream having a 78% probability. The counter was initialized to a 50% probability. The results show that about 10,000 samples where required before the input and measured probability streams converge.

The larger adaptive adder circuit does offer greater measurement resolution; but for measuring on-chip performance parameters, an 8-bit counter may be adequate. The smaller adaptive adder circuit offers the benefit of more quickly converging on the required value and better tracking of local fluctuations of the input data stream.

The performance parameters described so far, e.g., cache hit information, are easy to represent by a single bit. However, other parameters need more than 1-bit. Parameters such as the number of cycles needed to access external memory, or the number of clocks while the pipeline is stalled require more bits. Those parameters must be converted into a pulse stream containing several bits.

The example below shows how 4 serial bits may be used to measure a performance parameter which has a value ranging between 0 and 4.

| 1 | 0 | 0 | 0 | 1 |
| 2 | 0 | 1 | 0 | 1 |
| 3 | 1 | 1 | 0 | 1 |
| 1 | 0 | 0 | 0 | 1 |
| 4 | 1 | 1 | 1 | 1 |

If a parameter is measured to be 1 cycle then one serial bit of four is set. If a parameter is measured to be, e.g., 3 cycles, then 3-bits of the 4-bit pulse stream are set to one. This pulse stream is serially clocked into the adaptive adder circuit. There is no synchronous requirement for presenting data to the adaptive adder circuit. New parameter data can be sampled at any time and clocked into the adaptive adder circuit.

Different parameters will likely have differing value ranges. The above example has a value range of 0 to 4, but another parameter may have a value range 0 to 16. There is no need for all parameters to be restricted to the same data range. Adjusting the number of data bits used for each parameters data range, helps make best use of the adaptive adder circuit's restricted probability resolution.

An 8-bit adaptive adder circuit can measure a parameter with value range 0 to 4, and then later be used to measure a parameter with a data range of 0 to 16. In all cases the adaptive adder circuit determines the probability of the data stream being 1. For a value range of 0 to 4, a probability value of 75% represents a measured value of 3 (100% being 4).

When generating a sample value of, e.g., 3, any 3 bits can be set. It does not matter the order. However, varying which bits are set to represent the sampled value may have some small advantage in reducing the variance in counter operation.

Figure 6:
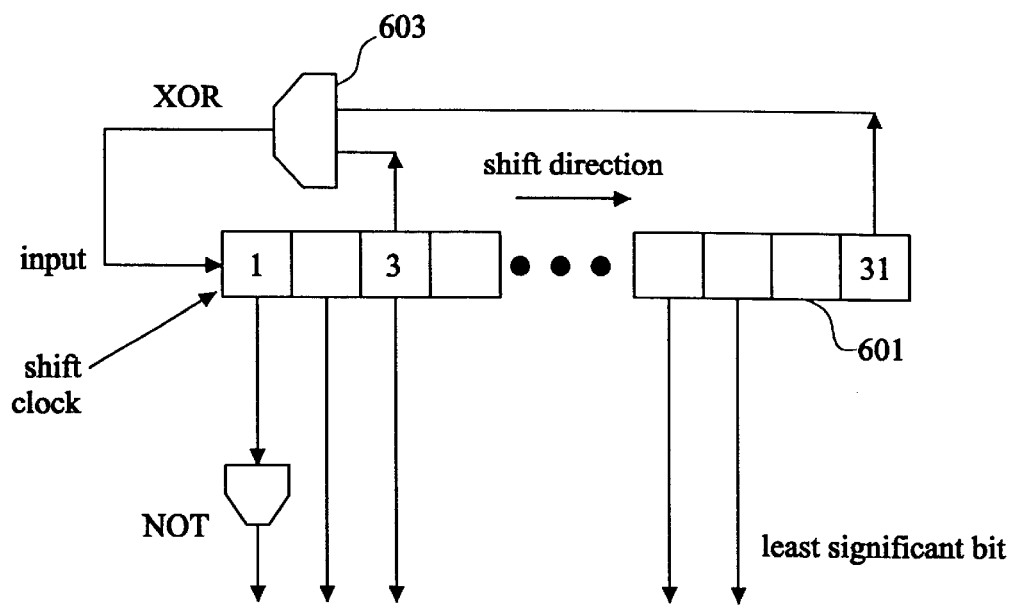
FIG. 6 shows a pseudo random number generator according to one embodiment of the invention.

The adaptive adder circuit operation uses a random number generator. A pseudo random number generator such as the exemplary pseudo random number generator shown in FIG. 6 can be used for this task. A maximum length (m-sequence) can be produced by feeding back selected stages of an n-stage shift register 601. The required stages are modulo-2 combined and used to produce the input signal for the first stage. The test data shown in FIGS. 3, 4 and 5 used a 31-bit shift register as shown in FIG. 6 with feed back being taken from stages 3 and 31, XORed in XOR gate 603 and provided to the input of the shift register. The top 8 or 12 bits were used to form the required random number. Other size shift registers (other than 31-bits) could also be used.

The adaptive adder circuit can be encouraged to converge on the required value by using random numbers which correlate. For example, convergence can be achieved by selecting consecutive stages of the shift register and inverting the most-significant bit (MSB). Hence, the MSB of the current random number will be inverted on output while the non-inverted value becomes the next-to MSB of the next random number.

Figure 7:
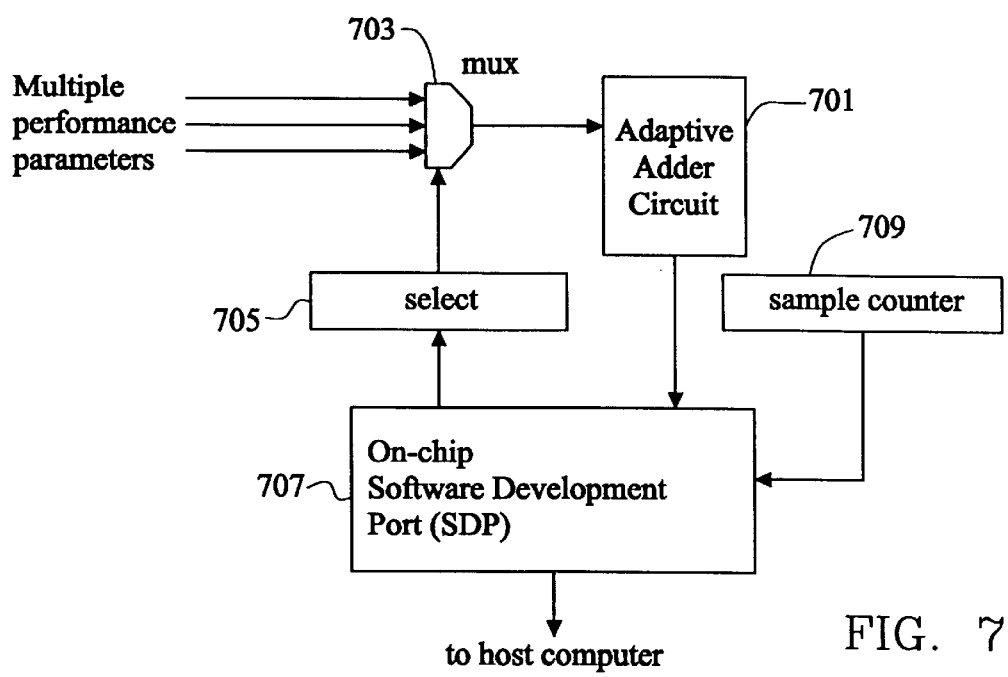
FIG. 7 shows an additional embodiment of the invention in which an integrated circuit has an adaptive adder circuit being provided multiple performance parameters, a select register to select a performance parameter, a sample counter and an input/output port.

There are typically multiple performance parameters of interest but there is no need to have an adaptive adder circuit allocated to each parameter being measured. A more economical approach is illustrated in FIG. 7 in which single adaptive adder circuit 701 receives a bit steam via an input multiplexer 703 that enables one of the multiple parameters to be selected for measurement. Select register 705 controls the selection of the performance parameter to be measured.

In one embodiment, the adaptive adder circuit resides on an integrated circuit which includes a microprocessor. In that case, select register 705 controlling parameter selection and the adaptive adder circuit counter should be accessible by the processor. The select register 705 and counter 709 could be mapped into register, I/O or memory address space. In addition, these registers may be accessible from an on-chip Software Development Port (SDP) 707 which is an input/output port providing test and debug access to internal registers of the processor, as is known in the art. Via the SDP 707 a host computer (not shown) connected to the input/output port, can unobtrusively examine performance parameters. There is no need to instrument the target system's application or operating system software and no interrupt handler is required.

After setting the select register 705 an 8-bit adaptive adder circuit 701 typically requires that about 500 or more samples be gathered before the adaptive adder circuit 701 is assumed to have tracked the new input data stream with a satisfactory degree of accuracy. To assist with that determination, sample counter 709 provides the ability to determine when the adaptive adder circuit can be assumed to have tracked the new input data stream. Sample counter 709 may be reset when the register 705 selecting parameter input is updated. The sample counter may then be examined via the Software Development Port 707 or from the processor before accessing the counter in the adaptive adder circuit counter to ensure a sufficient number of samples have been provided to the adaptive adder circuit so that the sample counter 709 value tracks the actual data. The sample counter should be large enough to reflect the size of the counter in the adaptive adder circuit. Thus, if the counter in the adaptive adder circuit is 12 bits, the sample counter needs to count to 10,000 or more to satisfactorily indicate when the measured data converges with the input parameter data. Overflow indications in the sample counter 709 can be utilized to indicate a satisfactory number of parameter samples have been received by the adaptive adder circuit.

In addition to the performance parameters described so far, measured performance parameters can include bus utilization by the processor. In one embodiment, a performance detecting circuit maps bus utilization by the processor in a manner similar to cache hits. For example, for each bus cycle, a "1" is provided to the performance monitoring circuit to indicate that the processor was the bus master for the cycle and a "0" indicates that an external bus master had the bus. Thus, the probability of the processor being bus master can be determined.

The description of the invention set forth herein is illustrative, and is not intended to limit the scope of the invention as set forth in the following claims. Variations and modifications may be made based on the description set forth herein, without departing from the scope and spirit of the invention as set forth in the following claims.

What is claimed is:

1. An integrated circuit comprising:
   a performance monitoring circuit including an adaptive adder circuit coupled to receive a first input signal indicative of a performance parameter of the integrated circuit and to provide a count value as a measure of the performance parameter, and
   wherein the adaptive adder circuit comprises, a random number generator circuit providing a random number;

a counter circuit providing the count value;

a comparator circuit coupled to compare the random number and the count value and to output a compare signal indicative thereof, the compare signal being provided to the counter circuit as an up/down count signal; and a first logic circuit coupled to receive the performance parameter and the compare signal and output a first control signal, the first control signal being provided for controlling operation of the counter circuit.

2. The integrated circuit as recited in claim 1 wherein the counter circuit is responsive to count up or down when the first input signal and the compare signal are at different values and wherein the counter circuit does not count when the first input signal and the compare signal are at the same value.

3. The integrated circuit as recited in claim 2 wherein the counter circuit is responsive to count down when the count value is greater than the random number and the first input signal is at a first value and wherein the counter is responsive to count up when the count value is less than the random number and the first input signal is at a second value.

4. The integrated circuit as recited in claim 1 further comprising a second logic circuit coupled to receive the first control signal and a clock signal, and output a gated clock signal to the counter circuit to selectively enable the counter circuit.

5. The integrated circuit as recited in claim 1 wherein the performance parameter is provided as a binary number to the performance monitoring circuit.

6. The integrated circuit as recited in claim 1 wherein the performance parameter is a measure of a hit rate in a cache memory.

7. The integrated circuit as recited in claim 5 further comprising a performance parameter detect circuit coupled to provide the performance parameter as the first input signal to the adaptive adder circuit, the performance parameter detect circuit providing the first input signal with a first value when a read operation results in a cache hit and a second value when another read operation results in a cache miss.

8. The integrated circuit as recited in claim 1 wherein the performance parameter has a value between 0 and n, n being a number greater than 1.

9. The integrated circuit as recited in claim 8 wherein the performance parameter is provided to the adaptive adder circuit as a serial bit stream, with n bits being present in the bit stream to represent the value of the performance parameter.

10. The integrated circuit as recited in claim 9 wherein the performance parameter has a value range between 0 and 4, and wherein four serial bits are provided to the adaptive adder circuit to represent the value of the performance parameter.

11. The integrated circuit as recited in claim 9 wherein the performance parameter has a value range between 0 and 16, and wherein sixteen serial bits are provided to the adaptive adder circuit to represent the value of the performance parameter.

12. The integrated circuit as recited in claim 1 wherein the integrated circuit is a microprocessor.

13. The integrated circuit as recited in claim 1 wherein the performance parameter is a parameter associated with bus utilization for a bus connected to said integrated circuit.

14. The integrated circuit as recited in claim 1 wherein the performance monitoring circuit further comprises:

a selector circuit receiving a plurality of performance parameters, the selector circuit being coupled to the adaptive adder circuit to provide a selected one of the performance parameters as the first input signal.

15. The integrated circuit as recited in claim 14 further comprising a programmable select register coupled to control the selector circuit, the select register being programmable to select one of the performance parameters as the first input.

16. The integrated circuit as recited in claim 1 further comprising an input/output port coupled to the performance monitoring circuit, the input/output port providing a host computer coupled to the input/output port access to the performance monitoring circuit.

17. An integrated circuit comprising:

a performance monitoring circuit including an adaptive adder circuit coupled to receive a first input signal indicative of a performance parameter of the integrated circuit and to provide a count value as a measure of the performance parameter; and wherein the performance monitoring circuit further comprises a sample counter, the sample counter coupled to count a number of samples of the performance parameter received by the performance monitoring circuit and to provide a sample count value indicative thereof, the sample count value indicating the accuracy of the count value in the performance monitoring circuit.

18. A method of measuring a performance parameter in an integrated circuit, comprising:

providing a first input signal indicative of the performance parameter to an adaptive adder circuit;

determining a count value in the adaptive adder circuit as a probability measure of the performance parameter;

wherein determining the count value further comprises, generating a random number in a random number generator circuit;

providing a counter circuit providing the count value;

comparing the random number and the count value and providing a compare signal indicative thereof, the compare signal being provided to the counter circuit as a first control signal; and logically combining the performance parameter and the compare signal to provide a second control signal for controlling operation of the counter circuit.

19. The method as recited in claim 18 wherein providing the first control signal to the counter circuit further comprises:

providing the compare signal to the counter circuit as an up/down count signal, the counter circuit counting down when the count value is greater than the random number and the first input signal is at a first value and the counter circuit counting up when the count value is less than the random number and the first input signal is at a second value.

20. The method as recited in claim 19 further comprising:

logically combining the second control signal and a clock signal to provide a gated clock signal to the counter circuit, the gated clock signal selectively enabling the counter circuit according to the value of the second control signal and the clock signal.

21. The method as recited in claim 18 wherein the performance parameter being measured is a hit rate in a cache memory and further comprising providing the performance parameter as the first input signal having a first value when a read operation results in a cache hit and having a second value when another read operation results in a cache miss.

22. The method as recited in claim 18 further comprising:

providing a performance parameter having a value between 0 and n, n being a number greater than 1, as a serial bit stream to the adaptive adder circuit; and providing n ones in the serial bit stream to represent the performance parameter having a value of n.

23. The method as recited in claim 18 wherein the integrated circuit includes a processor.

24. The method as recited in claim 18 wherein the performance parameter measured relates to cache access.

25. The method as recited in claim 18 further comprising:

providing a plurality of performance parameters to a selector circuit coupled to the adaptive adder circuit;

selecting one of the performance parameters to provide a selected one of the performance parameters as the first input signal.

26. The method as recited in claim 25 further comprising:

counting a number of samples of the performance parameter received by the adaptive adder circuit and providing a sample count value indicative thereof;

determining when to access the count value as a valid performance parameter according to the sample count value.

27. The method as recited in claim 29 further comprising:

writing a value to a programmable select register to select one of the performance parameters.

28. The method as recited in claim 18 further comprising:

accessing the count value from a host computer through an input/output port coupled to the adaptive adder circuit and to the host computer.

29. An apparatus for measuring a performance parameter of a computer system, comprising:

means for providing a first input signal indicative of the performance parameter to an adaptive adder circuit; and means for generating a count value as a probability measure of the performance parameter; and wherein the means for generating the count value comprises:

means for generating a random number;

a counter circuit providing the count value;

means for comparing the random number and the count value and for providing a compare signal indicative thereof; and means for controlling the counter circuit according to the compare signal and the first input signal.

30. The apparatus as recited in claim 29 further comprising means for selecting one of a plurality of performance parameters as the first input.

31. The apparatus as recited in claim 29 further comprising:

means for counting a number of samples of the performance parameter received by the means for generating the count and providing a sample count value indicative thereof.

32. An integrated circuit comprising:

a performance monitoring circuit including an adaptive adder circuit coupled to receive a first input signal indicative of a performance parameter of the integrated circuit and to provide a count value as a measure of the performance parameter; and wherein integrated circuit includes a processor; and wherein the adaptive adder circuit is accessible by the processor to receive the first input signal indicative of the performance parameter of the integrated circuit, generate a probability stream corresponding to a probability of the performance parameter, and adapt the probability stream to match the input data stream.

33. A method of measuring a performance parameter in an integrated circuit, comprising:

providing a first input signal indicative of the performance parameter to an adaptive adder circuit;

determining a count value in the adaptive adder circuit as a probability measure of the performance parameter;

sampling circuit operation to generate the first input signal;

comparing the first input signal to a probability signal to provide a compared signal;

logically combining the compared signal with a clock signal; and repeating the comparing and the logically combining for a predetermined number of samples.

\* \* \* \* \*